(12) United States Patent
Alb

(10) Patent No.: US 11,093,797 B1
(45) Date of Patent: Aug. 17, 2021

(54) FEATURE SUPERPOSITION PREDICTOR

(71) Applicant: Cristian Alb, Bucharest (RO)

(72) Inventor: Cristian Alb, Bucharest (RO)

( * ) Notice: Subject to any disclaimer, the term of this patent is extended or adjusted under 35 U.S.C. 154(b) by 0 days.

(21) Appl. No.: 17/098,408

(22) Filed: Nov. 15, 2020

(51) Int. Cl.
*G06N 20/00* (2019.01)
*G06K 9/62* (2006.01)
*G06F 16/903* (2019.01)

(52) U.S. Cl.
CPC ..... *G06K 9/6262* (2013.01); *G06F 16/90335* (2019.01); *G06K 9/6201* (2013.01); *G06K 9/623* (2013.01); *G06K 9/6288* (2013.01); *G06N 20/00* (2019.01)

(58) Field of Classification Search
USPC ...................................... 706/15, 45
See application file for complete search history.

(56) References Cited

U.S. PATENT DOCUMENTS 7,721,336 B1 * 5/2010 Adjaoute ............ H04L 63/1408
726/25
2019/0374160 A1 * 12/2019 Yin ........................ A61B 5/486

* cited by examiner

*Primary Examiner* — David R Vincent

(57) ABSTRACT

A set of methods and corresponding systems that analyze, predict, or classify data. The improvements are the result of techniques that leverage the simultaneous evaluation of training attributes.

14 Claims, 1 Drawing Sheet

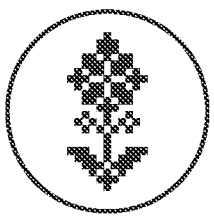 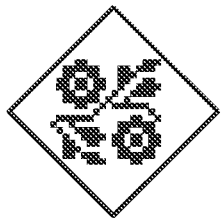 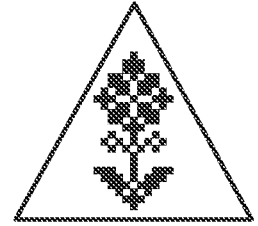 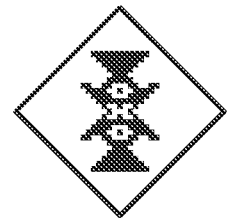
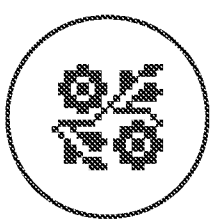 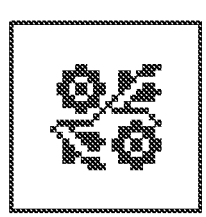 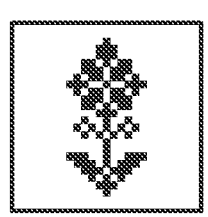 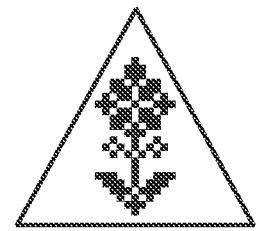
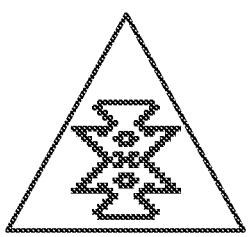 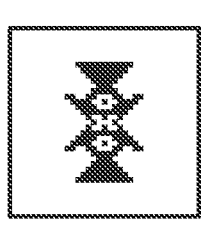 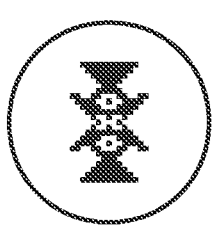 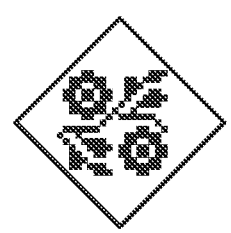
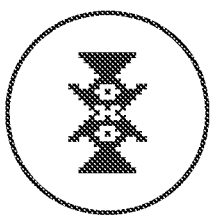 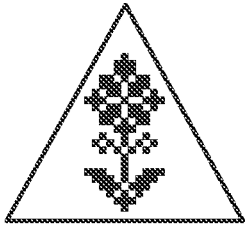 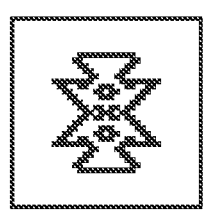 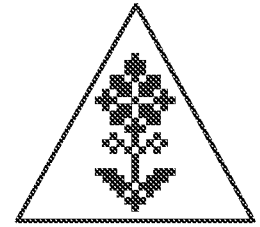
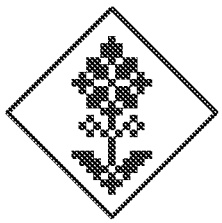 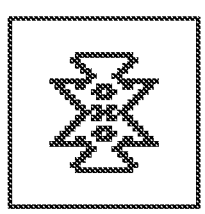 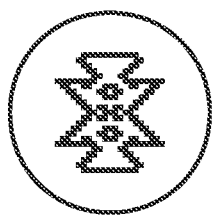 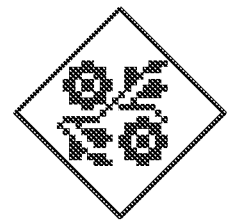
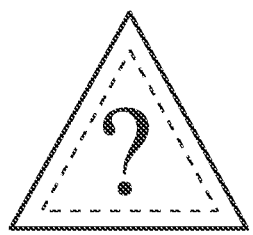

FEATURE SUPERPOSITION PREDICTOR

BACKGROUND

Field of Disclosure

The present disclosure relates generally to the fields of machine learning and data analysis, in particular to classification and prediction of data.

Description of Related Art

Techniques in machine learning, and data analysis in general, are used to discover correlations, patterns, and trends in data. They may also be used to predict data outcomes, or to classify them. An effective tool for this purpose is the decision tree. Decision trees can be used to classify output outcomes using a set of input attributes. Ensembles of decision trees, known as decision forests, proved to be quite successful in a variety of classification, and prediction tasks.

However, decision tree don't fully exploit the informative content of the training data, as they evaluate attributes sequentially, and ignore possible synergies among them.

SUMMARY

A set of methods and corresponding systems that analyze, predict, or classify data. The improvements are the result of techniques that leverage the simultaneous evaluation of training attributes.
The improvements are applicable to the fields of machine learning and data analysis.

BRIEF DESCRIPTION OF THE DRAWINGS

FIG. 1 shows a graphical representation of the generic prediction problem.

DETAILED DESCRIPTION

The following detailed description illustrates the principles and operation of the disclosed items.
* Note that, in this description, the usage of the term "set" is generally intended as ensemble, gathering, or collection; it doesn't always have the strict meaning used in the "set theory" branch of mathematics.
Also note that some concepts, procedures, and formulas in the disclosure are described in a pseudo programming language that imitates the style and structure of Python2.
Some of the notable conventions of the language:
=: denotes assignment;
==: denotes checking equality/equivalence;
*: denotes multiplication, e, g. 2*3=6;
: denotes raising to the power, e, g. 23=8.
: precedes a comment
Techniques in machine learning are often used to predict outcomes based on the knowledge of existing training data. A target outcome is an outcome of interest that needs to be predicted based on the attributes, or features, associated to it. FIG. 1 provides an intuitive representation of the problem. The inside pattern is the outcome of interest. The shape of the element is the attribute used to predict the target outcome. Decision trees are effective algorithms that implement such predictors.

Deodata Classifiers
Decision tree operation is based on the assumption that attributes predict the target outcomes better when evaluated in a predetermined order.
However, it is conceivable that the selected attribute champion, the one that best separates outcome values, is less efficient than a combination of attributes. The combination attributes, taken individually, might be less efficient in separating the outcome values.
The XOR problem is an example of situation where the decision tree prediction might not work in an optimal way. The disclosed methods, referred as "Deodata" methods, evaluate the attributes as an ensemble instead of evaluating each attribute sequentially as nodes in the branches of a tree.
The Deodata methods renounce the tree structure and collapse all branches into one evaluation instance. This can be seen also as a superposition, or flattening, of the decision tree branches. Such a scheme better exploits the likely synergies among the attributes.
The Deodata methods have the characteristics of "online algorithms". Supplementing the training data with more entries does not require a costly retraining operation.
Also, due to their nature, the methods can accommodate data sets containing entries for which some attributes are missing.
The Deodata methods are also essentially non parametric. They do not require choosing a specific parameter in order to operate. Of course, for specific cases, parameters and formulas can be tuned to take advantage of these features.
The training data set is equivalent to a table of values. Each row can be thought as a training instance. Columns correspond to attributes, or features, associated to the training instances. The target column is a particular column representing the outcome of interest. The target column classifies the row instance according to the outcome value. The other attribute columns contain attribute values that characterize the observed instances from the perspective of the feature attributes.
The training data set is conveniently represented as an ensemble formed by two parts: a target column vector and an array of feature attribute values.
The query entry consists of a list of values corresponding to the column attributes of the training data set.
One goal of the analysis is to predict the target outcome most likely associated to the query entry.
The query entry will be compared against the rows of the training data set.
Each attribute value of the currently evaluated training row will be compared with the corresponding attribute value of the query entry. A match column score is calculated for each attribute. The match column score can be, in the simplest form, a value of one, corresponding to a match, or zero otherwise.
For better results, the match column score can be made a function of the weight of the attribute and the scarcity of the two attribute values involved. The attribute weight could be a measure of the predictive power of the attribute relative to other attributes.
These attribute features could be determined in the beginning for all attributes and values. Once all attributes have been compared, an entry match score is computed for the currently evaluated training row. In the simplest form, this score is the sum of the match column scores of all attributes. Conceptually, a row summary ensemble is generated for the currently evaluated training row. The summary includes the target outcome, the entry match score. It could also include the list of attributes that did match and other information.

The row summary ensemble will be used to update the contents of a work data set. This work data set aggregates the content of the row summary ensemble for each of the evaluated rows of the training data set.

After the parsing of the rows is completed, the work data set will be processed in order to estimate likelihood measures for the target outcomes. These likelihood measures can subsequently be used for prediction, classification, or data analysis. The likelihood measures can be viewed also as virtual counts associated to the target outcomes. The informative content of these virtual counts can be evaluated in order to derive entropy or other impurity measures. For prediction or classification tasks, the target outcome with the highest likelihood will be used as output.

The Deodata methods can be classified into four main categories referred as "Delanga", "Varsate", "Marunte" and "Rasturnat". The generic mode of operation of these methods will be described in order to provide a better understanding.

The Deodata Delanga methods create a work data set that consists of an ensemble of target outcome collections. These collections can be viewed as lists, where the actual order of the elements is not relevant.

Each of these target outcome collections will be associated to a match score.

These collections will be referred as match score lists.

After the row summary ensemble is generated for a training row, the match score list corresponding to the entry match score will be updated by appending the target outcome to the list. If a list doesn't exist for the entry match score, it will be created and will contain the target outcome as element.

After the parsing of the rows is completed, the match score list corresponding to the top score is selected. The counts of the target outcomes will constitute the likelihood measures.

A tie situation occurs when counts are equal for a group of target outcomes. For these situations, a tie breaking procedure can be used. A tie breaking procedure consists in evaluating the next best match score list. If a tie still persist, the next best match score list is evaluated, etc.

The Deodata Varsate methods extend the processing done by the Deodata Delanga methods by aggregating the work data set into a set of cascaded match lists.

The processing is identical with that of the above described Deodata Delanga method, up to the generation of the match score lists. Once the lists are generated, it is required to order them such that the list with the best score is placed on top. The match score list at the top becomes the top cascaded match list. This top list will be appended to the next match score list of the work data set: the result is the cascaded match list for the lower level. The content of this lower level cascaded match list will be appended to the next lower level match score list, etc.

The process continues until all the lists have been processed. Each of the resulting cascaded match lists will be evaluated and assigned a predictive score.

The predictive score could be an impurity measure such as entropy, Gini index, or other information content measure. The list with the best predictive score will be used to derive the likelihood measures for classification, prediction, or data analysis. For instance, in case of prediction, the target outcome with most counts in the selected list becomes the predicted outcome.

Again, a tie breaking procedure can be used in situations where the target outcome counts are equal.

The Deodata Marunte methods create a work data set similar to the Delanga one, but with an additional layer of structure. Instead of being an ensemble of target outcome lists, it is an ensemble of lists containing structures with an associated target outcome list.

The target outcomes are aggregated not only as target outcomes sharing the same match score, but also sharing the same matching attributes. Therefore, outcomes of training instances, having the same attributes that match the query entry, form a subgroup list of outcomes. The subgroup list, together with the set of matching attributes, forms the subgroup ensemble. The subgroup ensembles are aggregated into a structure, for instance a list. The work data set becomes a collection of lists containing as elements the subgroup ensembles.

The top entry of the work data set is used to determine the likelihood measures. An impurity measure for each subgroup list is evaluated. The subgroup list with the lowest impurity measure will be selected as the champion outcome list. The counts of the target outcomes in the champion list will provide the likelihood measures.

In case the best impurity measure is a value shared by several subgroup lists, the contents of the tied lists can be merged together in an extended champion list.

An accuracy improvement is possible at the cost of additional processing. This improvement can address the situations where there are duplicate attribute columns in the training data. If the attributes are not vetted in the preprocessing of the training data, the duplicates get excessive weight and negatively influence the accuracy of the results. This improvement requires ignoring the match score for unique or rare attribute match combinations.

A heterogeneous top list is created by allowing all subgroup ensembles that have maximal unique combinations of attribute matches. An attribute match combination is a maximal unique combination if there isn't another combination that includes the matched attributes.

The heterogeneous top list becomes the top entry of the work data set and is processed as described above.

The Deodata Rasturnat methods create a work data set that consists of an ensemble of target outcome entries, where each entry has a cumulative outcome score.

After the row summary ensemble is generated for a training row, the corresponding target outcome score entry of the work data set is updated with the entry match score. The updating could consist in applying a transformation function to the entry match score, and adding the resulting value to the outcome score. The transformation function could be an exponential function like a power of two, or a Gaussian.

After the parsing of the rows is completed, the work data set will contain the target outcomes likelihood measures.

The following pseudo-code excerpt shows an embodiment that illustrates the Delanga. Varsate and Rasturnat variations of the Deodata method for a classifier:

```
>-----------------------------------------------------------------
def DeodataClassifier( query_attr, attr_table,
                                targ_outc_list, operation_mode ) :
    # params:
    #    query_attr
    #       list of attribute values of the query entry.
    #       e. g.
    #           [ 'a1', 'b2', 'c1', 'd0', 'e1', 'f2' ]
    #    attr_table
    #       attribute part of the training data set. Can be viewed
    #       as a table of values, wherein each row corresponds to
    #       a training instance. Columns correspond to attributes
    #       associated to the training instance.
    #       e. g.
    #           [[ 'a1', 'b0', 'c2', 'd0', 'e0', 'f1' ],
    #            [ 'a1', 'b0', 'c2', 'd0', 'e0', 'f0' ],
```

```
#                [ 'a1', 'b0', 'c1', 'd1', 'e1', 'f2' ]]
#       targ_outc_list
a list representing the target outcome part of the
#          training data set. Can be viewed as a column vector
#          where each row represents the target outcome of the
#          corresponding row in the attribute table.
#       e. g.
#            [ 't0',
#               't0',
#               't2' ]
#       operation_mode
#          parameter use to specify the operation mode.
#          Options are:
#               'delanga'
#               'varsate'
#               'rasturnat'

# output:
#     the most likely target prediction/classification for the
#     input query.

if operation_mode == None:
    # set default parameter
    operation_mode = 'delanga'
tbl_row_no = len (attr_table)
attr_col_no = len(attr_table[0])
# attr_col_no == 6
work_dataset = { }
for row_idx in range(tbl_row_no):
    # evaluate current row
    eval_row = attr_table[row_idx]
    eval_outcome = targ_outc_list [row_idx]
    col_score_list = [ ]
    for attr_idx in range(attr_col_no) :
        # evaluate current attribute term
        attr_val_query = query_attr[attr_idx]
        attr_val_row = eval_row[attr_idx]
        # AttrMatchEval( ) is the function that evaluates the
        #    match column score
        col_match = AttrMatchEval(attr_idx, attr_val_query,
                                           attr_val_row)
        col_score_list.append(col_match)
    # compute the entry match score for the current row
    entry_match_score = EntryMatchEval(col_score_list)
    row_summary = { }
    row_summary['outcome'] = eval_outcome
    row_summary['score'] = entry_match_score
    # aggregate row summary into the work data set
    outcome = row_summary['outcome']
    score = row_summary['score']
    if ( operation_mode == 'delanga'
       or operation_mode == 'varsate' ) :
        if score not in work_dataset :
            work_dataset[score] = [outcome]
        else :
            work_dataset[score] += [outcome]
    else :
        # operation_mode == 'rasturnat'
        # apply transformation to the entry match score
        transf_score = TransformScore(score)
        if outcome not in work_dataset :
            work_dataset[outcome] = transf_score
        else :
            work_dataset[outcome] += transf_score
# obtain likelihood measures from work data set
if operation_mode == 'delanga' :
    # get an ordered data set
    # e.g. work_dataset = { score_a: ['t0', 't2', 't1'],
    #                       score_b: ['t1'] }
    ordered_score_list = GetScoreOrdered(work_dataset)
    # e.g.
    #     ordered_score_list = [ [score_b, ['t1', 't1']],
    #                             [score_a, ['t0', 't2', 't1'] ]
    # get top score from ordered list
    top_score_list = ordered_score_list[0][1]
    likelihood_data = GetCountToLikelihood(top_score_list)
    # In case of outcome ties, a procedure that uses
    #    next best score (ordered_score_list[i+1][1])
    #    can be used.
    if operation_mode == 'varsate' :
        # get an ordered data set
        ordered_score_list = GetScoreOrdered(work_dataset)
        # aggregate score lists into increasingly inclusive
        #    score lists starting from the top
        score_no = len (ordered_score_list)
        accumulated_list = [ ]
        cascaded_list = [ ]
        for crt_idx in range (score_no) :
            # append current match score list
            accumulated_list += ordered_score_list[crt_idx][1]
            cascaded_list[crt_idx] = accumulated_list
        # the no match cascaded entry contains everything
        cascaded_list[score_no] = targ_outc_list
        # evaluate each cascaded entry impurity score
        #    and select entry with best score
        cascaded_max_score = 0
        crt_champion_list = [ ]
        for crt_idx in range(score_no + 1) :
            crt_score = ImpurityScore(cascaded_list[crt_idx])
            if crt_score > cascaded_max_score
                # a new champion has been found
                cascaded_max_score = crt_score
                crt_champion_list = cascaded_list[crt_idx]
            elif crt_score == cascaded_max_score
                # append to current champion list
                crt_champion_list += cascaded_list[crt_idx]
        top_score_list = crt_champion_list
        likelihood_data = GetCountToLikelihood(top_score_list)
        # In case of outcome ties, a procedure that uses
        #    next best impurity score in cascaded_list
        #    can be used.
    else :
        # operation_mode == 'rasturnat'
        # e.g. work_dataset = { 't0': score_x
        #                        t1': score_y,
        #                        't2': score_z }
        # order outcome entries using the accumulated score
        order_outc_list = OrderOutcomes(work_dataset)
        likelihood_data = GetScoreToLikelihood(order_outc_list)
predict_outcome = likelihood_data[0]['outcome']
predict_outcome is the chosen prediction of the method
return predict_outcome
```

An example detailing the operation of the deodata methods follows.

Note that the examples come in pairs, one corresponds to a Deodata Delanga type and the other to a Deodata Rasturnat type.

The following simple training data is used for training:

```
# attr_table:
#    the attribute table corresponding to the training data set
attr_table == [
         [ 'a1', 'b0', 'c2', 'd2', 'e2', 'f1' ] ,     # 't2'
         [ 'a1', 'b0', 'c2', 'd0', 'e0', 'f1' ] ,     # 't1'
         [ 'a1', 'b0', 'c1', 'd0', 'e0', 'f0' ] ,     # 't0'
         [ 'a1', 'b0', 'c1', 'd1', 'e1', 'f2' ] ,     # 't2'
         [ 'a1', 'b0', 'c1', 'd2', 'e2', 'f0' ] ,     # 't2'
         [ 'a1', 'b1', 'c2', 'd0', 'e0', 'f1' ] ,     # 't1'
         [ 'a1', 'b0', 'c2', 'd0', 'e0', 'f2' ] ,     # 't0'
         [ 'a1', 'b0', 'c1', 'd0', 'e0', 'f2' ] ,     # 't1'
         ]
# targ_outc_list:
#    the outcome list corresponding to the training data set
targ_outc_list == ['t2', 't1', 't0', 't2', 't2', 't1', 't0', 't1']
```

The query entry is the following:

```
>------------------------------------------------------------------
    query_attr = ['a1', 'b2', 'c1', 'd0', 'e1', 'f2']
<------------------------------------------------------------------
```

It has six attributes. The query entry is compared against each row of the training table. Note that in this example the most simple score functions are used. For matching attribute values, a point is assigned in case of a match and none otherwise. The relevance/weight of the attribute, or the scarcity of the attribute values, are ignored in order to provide a simplified description.

```
>------------------------------------------------------------------
    ###
    eval_outcome = 't2'
    eval_row  =  ['a1', 'b0'. 'c2', 'd2', 'e2', 'f1']
    query_attr = ['a1', 'b2', 'c1', 'd0', 'e1', 'f2']
    # matches     Y   N   N   N   N   N
    #     1 match
    col_score_list = [1, 0, 0, 0, 0, 0]
    # entry_match_score = EntryMatchEval(col_score_list)
    entry_match_score = sum(col_score_list)
    entry_match_score == 1
    if (operation_mode == 'delanga' or operation_mode == 'varsate') :
        work_dataset(entry_match_score) += eval_outcome
        work_dataset[1] == ['t2']
    else :
        # operation_mode == 'rasturnat'
        # transf_score = TransformScore(entry_match_score)
        transf_score = 2 ** entry_match_score
        work_dataset[eval_outcome] += transf_score
        work_dataset['t2'] == 2
    ###
    eval_outcome 't1'
    eval_row  =  ['a1', 'b0', 'c2', 'd0', 'e0', 'f1']
    query_attr = [a1', 'b2', 'c1', 'd0', 'e1', 'f2']
    # matches     Y   N   N   Y   N   N
    #     2 matches
    col_score_list = [1, 0, 0, 1, 0, 0]
    entry_match_score - sum(col_score_list)
    entry_match_score == 2
    if (operation_mode == 'delanga' or operation_mode == 'varsate') :
        work_dataset[entry_match_score] += eval_outcome
        work_dataset [2] == ['t1']
    else :
        # operation_mode == 'rasturnat'
        transf_score = 2 ** entry_match_score
        work_dataset [eval_outcome] += transf_score
        work_dataset['t1'] == 4
    ###
    eval outcome = 't0'
    eval_row  =  ['a1', 'b0', 'c1', 'd0', 'e0', 'f0']
    query_attr = ['a1', 'b2', 'c1', 'd0', 'e1', 'f2']
    # matches     Y   N   Y   Y   N   N
    #     3 matches
    col_score_list = [1, 0, 1, 1, 0, 0]
    entry_match_score == 3
    if (operation_mode 'delanga' or operation_mode == 'varsate') :
        work_dataset[entry_match_score] += eval_outcome
        work_dataset[3] == ['t0']
    else :
        # operation_mode == 'rasturnat'
        transf_score = 2 ** entry_match_score
        work_dataset[eval_outcome] += transf_score
        work_dataset['t0'] == 8
    ###
    eval_outcome = 't2'
    eval_row  =  ['a1', 'b0', 'c1', 'd1', 'e1', 'f2']
    query_attr = ['a1', 'b2', 'c1', 'd0', 'e1', 'f2']
    # matches     Y   N   Y   N   Y   Y
    #     4 matches
    col_score_list = [1, 0, 1, 0, 1, 1]
    entry_match_score = sum(col_score_list)
    entry_match_score == 4
    if (operation_mode == 'delanga' or operation_mode == 'varsate') :
        work_dataset[entry_match_score] += eval_outcome
        work_dataset[4] == ['t2']
    else :
        # operation_mode == 'rasturnat'
        transf_score = 2 ** entry_match_score
        work_dataset [eval_outcome] += transf_score
        work_dataset['t2'] == 2 + 16 == 18
    ###
    eval outcome = 't2'
    eval_row  =  ['a1', 'b0', 'c1', 'd2', 'e2', 'f0']
    query_attr = ['a1', 'b2', 'c1', 'd0', 'e1', 'f2']
    # matches     Y   N   Y   N   N   N
    #     2 matches
    col_score_list = [1, 0, 1, 0, 0, 0]
    entry_match_score = sum(col_score_list)
    entry_match_score == 2
    if (operation_mode == 'delanga' or operation_mode == 'varsate') :
        work_dataset[entry_match_score] += eval_outcome
        work_dataset(2) == ['t1', 't2']
    else :
        # operation_mode == 'rasturnat'
        transf_score = 2 ** entry_match_score
        work_dataset[eval_outcome] += transf_score
        work_dataset['t2'] == 18 + 4 == 22
    ###
    eval outcome = 't1'
    eval_row  =  ['a1', 'b1', 'c2', 'd0', 'e0', 'f1']
    query_attr = ['a1', 'b2', 'c1', 'd0', 'e1', 'f2']
    # matches     Y   N   N   Y   N   N
    #     2 matches
    col_score_list = [1, 0, 0, 1, 0, 0]
    entry_match_score = sum(col_score_list)
    entry_match_score == 2
    if (operation_mode == 'delanga' or operation_mode == 'varsate') :
        work_dataset[entry_match_score] +# eval_outcome
        work_dataset[2]== ['t1', 't2', 't1']
    else :
        # operation_mode == 'rasturnat'
        transf_score = 2 ** entry_match_score
        work_dataset[eval_outcome] += transf_score
        work_dataset['t1'] == 4 + 4 == 8
    ###
    eval_outcome = 't0'
    eval_row  =  ['a1', 'b0', 'c2', 'd0', e0', 'f2']
    query_attr = ['a1', 'b2', 'c1', 'd0', 'e1', 'f2']
    # matches     Y   N   N   Y   N   Y
    #     3 matches
    col_score_ list = [1, 0, 0, 1, 0, 1]
    entry_match_score = sum(col_score_list)
    entry_match_score == 3
    if (operation_mode == 'delanga' or operation_mode == 'varsate') :
        work_dataset[entry_match_score] += eval_outcome
        work_dataset[3] == ['t0', 't0']
    else :
        # operation_mode == 'rasturnat'
        transf_score = 2 ** entry_match_score
        work_dataset[eval_outcome] += transf_score
        work_dataset['t0'] == 8 + 8 == 16
    ###
    eval_outcome = 't1'
    eval_row  =  ['a1', 'b0', 'c1', 'd0', 'e0', 'f2']
    query_attr = ['a1', 'b2', 'c1', 'd0', 'e1', 'f2']
    # matches     Y   N   Y   Y   N   Y
    #     4 matches
    col_score_list = [1, 0, 1, 0, 1, 1]
    entry_match_score = sum[col_score_list]
    entry_match_score == 4
    if (operation_mode == 'delanga' or operation_mode == 'varsate') :
        work_dataset[entry_match_score] += eval_outcome
        work_dataset[4] == ['t2', 't1']
    else :
        # operation_mode == 'rasturnat'
        transf_score = 2 ** entry_match_score
        work_dataset[eval_outcome] += transf_score
        work_dataset ['t1'] == 8 + 16 == 24
<------------------------------------------
```

After parsing all training entries, the work data set looks as follows:

```
> ---------------------------------------------------------------------
    if (operation_mode == 'delanga' or operation_mode == 'varsate') :
        work_dataset == {
                        1:['t2'],
                        2:['t1', 't2', 't1'],
                        3:['t0', 't0'],
                        4:['t2', 't1'],
                        }
    else :
        # operation_mode == 'rasturnat'
        work_dataset == {
                        't0': 16,
                        't2': 22,
                        't1': 24,
                        }
< ---------------------------------------------------------------------
```

The above descriptions are provided just as exemplifications to facilitate an understanding of the operating principle. Better implementations are possible. For instance, instead of storing the target outcomes, an index to the row in the training table would suffice.

The following pseudo-code excerpt illustrate how the work_dataset structure is processed in order to generate the likelihood measures:

```
> ---------------------------------------------------------------------

    if operation_mode == 'delanga' :
        ordered_score_list = GetScoreOrdered(work_dataset)
        ordered_score_list == [
                        [4, ['t2', 't1']],
                        [3, ['t0', 't0']],
                        [2, ['t1', 't2', 't1']],
                        [1, ['t2']]
                        ]
        # the top score corresponds to the first entry (index 0).
        top_score_list = ordered_score_list[0][1]
        top_score_list == ['t2','t1']
        # the likelihood measure is represented by the outcome counts
        likelihood_data = GetCountToLikelihood(top_score_list)
        likelihood_data == [
                        {'outc':'t2', 'score':1},
                        {'outc':'t1', 'score':1}
                        ]

    elif operation_mode == 'varsate':
        ordered_score_list = GetScoreOrdered(work_dataset)
        ordered_score_list == [
                        [4, ['t2', 't1']],
                        [3, ['t0', 't0']],
                        [2, ['t1', 't2', 't1']],
                        [1, ['t2']]
                        ]
        # aggregate score lists into increasingly inclusive
        #     score lists starting from the top
        accumulated_list = [ ]
        cascaded_list = [ ]
        accumulated_list += ordered_score_list[0][1]
        accumulated_list == ['t2','t1']
        cascaded_list[0] = accumulated_list
        cascaded_list == [['t2','t1']]
        accumulated_list += ordered_score_list[1][1]
        accumulated_list == ['t2','t1','t0','t0']
        cascaded_list[1] = accumulated_list
        cascaded_list == [['t2','t1'], ['t2','t1','t0','t0']]
        accumulated_list += ordered_score_list[2][1]
        accumulated_list == ['t2','t1','t0','t0','t1','t2','t1']
        cascaded_list[2] = accumulated_list
        cascaded_list == [
                        ['t2','t1'],
                        ['t2','t1','t0','t0'],
                        ['t2','t1','t0','t0','t1','t2','t1'],
```

```
                        ]
        accumulated_list += ordered_score_list[3][1]
        accumulated_list == ['t2','t1','t0','t0','t1','t2','t1','t2']
        cascaded_list[3] = accumulated_list
        cascaded_list == [
                        ['t2','t1'],
                        ['t2','t1','t0','t0'],
                        ['t2','t1','t0','t0','t1','t2','t1'],
                        ['t2','t1','t0','t0','t1','t2','t1','t2']
                        ]
        # evaluate the impurity score of each cascaded entry
        casc_score_list = [ ]
        crt_ent = Entropy(cascaded_list[0])
        cascd_score_list[0] = [-crt_ent, cascaded_list[0]]
        crt_ent = Entropy(cascaded_list[1])
        cascd_score_list[1] = [-crt_ent, cascaaed_list[1]]
        crt_ent = Entropy(cascaded_list[2])
        cascd_score_list[2]= [-crt_ent, cascaded_list[2]]
        crt_ent = Entropy(cascaded_list[3])
        cascd_score_list[3] = [-crt_ent, cascaded_list[3]]
        cascd_score_list == [
                        [-1.0, ['t2','t1']],
                        [-1.5, ['t2','t1','t0','t0']],
                        [-1.55665, ['t2','t1','t0','t0','t1','t2','t1']],
                        [-1.56127, ['t2','t1','t0','t0','t1','t2','t1','t2']]
                        ]
        # the best score, in this mode of operation, corresponds to
        #     the lowest entropy, that is the first entry (index 0).
        top_score_list = ordered_score_list[0][1]
        top_score_list == ['t2', 't1']
        # the likelihood measure is represented by the outcome counts
        likelihood_data = GetCountToLikelihood(top_score_list)
        likelihood_data == [
                        {'outc':'t2', 'score':1},
                        {'outc':'t1', 'score':1}
                        ]

    else :
        # operation_mode == 'rasturnat'
        # order outcome entries using the accumulated score
        order_outc_list = OrderOutcomes(work_dataset)
        order_outc_list == [
                        [24, 't1'],
                        [22, 't2'],
                        [16, 't0']
                        ]
        # the likelihood measure is represented by the outcome score
        likelihood_data = GetScoreToLikelihood(order_outc_list)
        likelihood_data == [
                        {'outc':'t1', 'score':24}
                        {'outc':'t2', 'score':22},
                        {'outc':'t0', 'score':16}
                        ]
< ---------------------------------------------------------------------
```

It can be seen in the above example that, for operation modes 'delanga and 'varsate', two outcome types have the same associated score. This is a tie situation.

One possibility of breaking the tie is to search for additional counts in the below ensemble. The following pseudo-code excerpt illustrates such a procedure:

```
> ---------------------------------------------------------------------
if operation_mode == 'delanga' :
    ordered_score_list = GetScoreOrdered(work_dataset)
    ordered_score_list == [
                    [4, ['t2', 't1']],
                    [3, ['t0', 't0']],
                    [2, ['t1', 't2', 't1']],
                    [1, ['t2']]
                    ]
    # the top score corresponds to the first entry (index 0).
    top_score_list = ordered_score_list [0][1]
    top_score_list == ['t2', 't1'],
    # the liklihood measure is represented by the outcome
    counts
```

```
        likelihood_data = GetCountToLikelihood(top_score_list)
        likelihood_data == [
                            {'outc':'t2', 'score':1},
                            {'outc':'t1', 'score':1}
                           ]
        # to break the tie the next best entries are searched
        #     for additional counts:
        tie_index = 0
        next_entry_list = ordered_score_list[tie_index + 1][1]
        next_entry_list == ['t0', 't0']
        # the list doesn't contain instances of any of the tied
        #     outcomes 't2' or 't1', therefore it is ignored.
        # evaluate next index
        next_entry_list = ordered_score_list[tie_index + 2][1]
        next_entry_list == ['t1', 't2', 't1']
        # in this list there are 2 counts for 't1' and only one
        #     for 't2'. Therefore 't1' is chosen as the best predictor.
        #     predict_outcome = 't1'
<-----------------------------------------------------------------
```

Another possible tie breaking procedure consists in combining the Delanga Varsate or Marunte methods with the Rasturnat method. For instance, the target outcome scores of the Rasturnat method could be used as tie breakers. And vice versa, the other Deodata methods could be used to break ties when Rasturnat is the primary method.

The following pseudo-code excerpt shows an embodiment that illustrates a Marunte variation of the Deodata method for a classifier:

```
>-----------------------------------------------------------------
    def DeodataMarunteClassifier( query_attr, attr_table,
                                  targ_outc_list ) :
# params:
#     query_attr
#         list of attribute values of the query entry.

#     attr_table
#         attribute part of the training data set.

#     targ_outc_list
a list representing the target outcome part of the
#         training data set.

# output:
#     the most likely target prediction/classification for the
#     input query.

tbl_row_no = len(attr_table)
attr_col_no = len(attr_table[0])
work_dataset = {'top': [ ], 'generic':[ ]}
for row_idx in range (tbl_row_no)
    # evaluate current row
    eval_row = attr_table[row_idx]
    eval_outcome = targ_outc_list[row_idx]
    eval_match_list = [0] * attr_col_no
    # e.g.
    #     if attr_col_no == 6 :
    #         eval_match_list == [0, 0, 0, 0, 0, 0]
    # determine attribute columns that match query
    for attr_idx in range(attr_col_no) :
        # evaluate current attribute term
        attr_val_query = query_attr [attr_idx]
        attr_val_row = eval_row[attr_idx]
        if attr_val_query == attr_val_row :
            eval_match_list[attr_idx] = 1
    # compute the entry match score for the current row
    row_summary = { }
    entry_match_score = sum(eval_match_list)
    row_summary['score'] = entry_match_score
    row_summary['outcome'] = eval_outcome
    row_summary['matches']= eval_match_list
    # check whether other entries exist with the same
    #     attribute matches.
    delayed_add_flag = True
    ###
    for crt_top in work_dataset['top']:
        crt_matches = crt_top['matches']
        more_in_top_flag = False
        more_in_eval_flag = False
        for attr_idx in range(attr_col_no) :
            if not (crt_matches[attr_idx] ==
                           eval_match_list [attr_idx]) :
                # there is an attribute mismatch
                if eval_match_list[attr_idx]== 1 :
                    # an additional attribute match in
                    #   eval_match_list
                    more_in_eval_flag = True
                else :
                    # an additional attribute match in
                    #   crt_matches
                    more_in_top_flag = True
        if (
                more_in_eval_flag == False
                and more_in_top_flag == False
           ) :
            # the top subgroup is similar
            # append entry to the matching subgroup
            crt_top['outcome'] += (eval_outcome)
            delayed_add_flag = False
            break
        elif (
                more_in_eval_flag == False
                and more_in_top_flag == True
             ) :
            # the top entry has more matches than the
            #   evaluated entry.
            #   Relegate evaluated entry to the generic section
            work_dataset['generic'] += [eval_outcome]
            delayed_add_flag = False
            break
        elif (
                more_in_eval_flag == True
                and more_in_top_flag == False
             ) :
            # the evaluated entry has more matches than the
            #   top entry.
            #   Replace top entry with evaluated entry.
            work_dataset['generic'] += crt_top['outcome']
            work_dataset['top'].remove(crt_top)
            # the evaluated entry will be added after all
            #   entries in the top part have been checked
        elif (
                more_in_eval_flag == True
                and more_in_top_flag == True
             ) :
            # the evaluated entry is potentially a candidate
            #   for an additional top entry.
            #   Needs to be further checked against remaining
            #   top entries.
            # the evaluated entry will be potentially added
            #   after all entries in the top part have
            #   been checked
            pass
    ###
    if delayed_add_flag :
        # the evaluated entry match needs to be added
        #   to the top part of the work data set.
        new_top = { }
        new_top['matches'] = eval_match_list
        new_top['outcome'] = [eval_outcome]
        work_dataset['top'].append(new_top)
# the work data set has been created
#     Compute the impurity measure for the subgroup entries in
#     the 'top' part of the work data set.
minimal_impurity = None
champion_list = None
aggregated_list = [ ]
for crt_subgroup in work_dataset['top'] :
    crt_outc_list = crt_subgroup['outcome']
    aggregated_list += crt_outc_list
    crt_impurity = Entropy(crt_outc_list)
    if minimal_impurity == None :
        minimal_impurity = crt_impurity
```

```
                    champion_list = crt_outc_list
                else :
                    if minimal_impurity > crt_impurity :
                        minimal_impurity = crt_impurity
                        champion_list = crt_outc_list
                    elif minimal_impurity == crt_impurity :
                        # append to champion subgroup
                        champion_list += crt_outc_list
    top_score_list = champion_list
    likelihood_data = GetCountToLikelihood(top_score_list)
    # In case of outcome ties, aggregated_list can be used
    #     to break the tie.
    #     If that doesn't suffice, the generic part
    #     of the work data set can be used
    #     (work_dataset['generic']).
    predict_outcome = likelihood_data[0]['outcome']
    predict_outcome is the chosen prediction of the method
    return predict_outcome
<---------------------------------------------------->
```

An example detailing the operation of the Deodata Marunte method follows. The following simple data is used for training:

```
>--------------------------------------------------------------------
    # attr_table:
    #     the attribute table corresponding to the training data
    set
    attr_table == [
                    [ 'a1', 'b0', 'c1', 'd0', 'e2', 'f1' ], # 't2'
                    [ 'a1', 'b0', 'c1', 'd2', 'e2', 'f1' ], # 't1'
                    [ 'a1', 'b0', 'c0', 'd2', 'e1', 'f1' ], # 't0'
                    [ 'a1', 'b0', 'c2', 'd2', 'e1', 'f1' ], # 't0'
                    [ 'a1', 'b1', 'c1', 'd2', 'e1', 'f2' ], # 't1'
                    [ 'a1', 'b0', 'c1', 'd1', 'e1', 'f2' ], # 't0'
                ]
    # targ_outc_list:
    #     the outcome list corresponding to the training data set
    targ_outc_list == ['t2', 't1', 't0', 't0', 't1', 't0' ]
<---------------------------------------------------------------->
```

The query entry is the following:

```
>--------------------------------------------------------------------
    query_attr = ['a1', 'b1', 'c1', 'd0', 'e1', 'f2']
<---------------------------------------------------------------->
```

It has six attributes. The query entry is compared against each row of the training table.

```
>--------------------------------------------------------------------
    ###
    work_dataset == {'top':[ ], 'generic':[ ]}
    ###
    eval_outcome = 't2'
    eval_row =  ['a1', 'b0', 'c1', 'd0', 'e2', 'f1']
    query_attr = ['a1', 'b2', 'c1', 'd0', 'e1', 'f2']
    # matches    Y   N   Y   Y   N   N
    #     3 matches
    eval_match_list = [1, 0, 1, 1, 0, 0]
    # entry_match_score = EntryMatchEval(eval_match_list)
    entry_match_score = sum(eval_match_list)
    entry_match_score == 3
    # first entry, add it to 'top' section
    new_top = { }
    new_top = {'matches': eval_match_list, 'outcome': [eval_outcome]}
    work_dataset['top'].append(new_top)
    work_dataset == {
        'top': [
            {'matches': [1, 0, 1, 1, 0, 0], 'outcome': ['t2']}
        ]
        'generic': [ ]
```

```
    }
    ###
    eval_outcome = 't1'
    eval_row =  ['a1', 'b0', 'c1', 'd2', 'e2', 'f1']
    query_attr = ['a1', 'b2', 'c1', 'd0', 'e1', 'f2']
    # matches    Y   N   Y   N   N   N
    #     2 matches
    eval_match_list = [1, 0, 1, 0, 0, 0]
    entry_match_score = sum(eval_match_list)
    entry_match_score == 2
    # the matching attributes form a subset included in
    #     an entry already part of the top. Add entry to
    #     the generic part.
    #
    #     top member: [1,0,1,1,0,0]
    #     eval: [1,0,1,0,0,0]
    new_generic = [eval_outcome]
    work_dataset['generic'] += new_generic
    work_dataset == {
        'top': [
            {'matches': [1, 0, 1, 1, 0, 0],'outcome': ['t2']}
        ]
        'generic': ['t1']
    }
    ###
    eval_outcome = 't0'
    eval_row =  ['a1', 'b0', 'c0', 'd2', 'e1', 'f1']
    query_attr = ['a1', 'b2', 'c1', 'd0', 'e1', 'f2']
    # matches    Y   N   N   N   Y   N
    #     2 matches
    eval_match_list = [1, 0, 0, 0, 1, 0]
    entry_match_score = sum(eval_match_list)
    entry_match_score == 2
    # the matching attributes form a new combination subset.
    #     Although has less matches, add entry to top part.
    #
    #     top member: [1,0,1,1,0,0]
    #     eval: [1,0,0,0,1,0]
    new_generic = (eval_outcome)
    work_dataset['generic'] += new_generic
    work_dataset == {
        'top': [
            {'matches': [1, 0, 1, 1, 0, 0], 'outcome': ['t2']}
            {'matches': [1, 0, 0, 0, 1, 0], 'outcome': ['t0']}
        ]
        'generic': ['t1']
    }
    ###
    eval_outcome = 't0'
    eval_row =  ['a1', 'b0', 'c2', 'd2', 'e1', 'f1']
    query_attr = ['a1', 'b2', 'c1', 'd0', 'e1', 'f2']
    # matches    Y   N   N   N   Y   N
    #     2 matches
    eval_match_list = [1, 0, 0, 0, 1, 0]
    entry_match_score = sum(eval_match_list)
    entry_match_score == 2
    # the matching attributes are the same. Append outcome to
    #     existing top subgroup list.
    #
    #     top member: [1,0,0,0,1,0]
    #     eval: [1,0,0,0,1,0]
    work_dataset['top'][0]['outcome'].append(eval_outcome)
    work_dataset == {
        'top': [
            ['matches': [1, 0, 1, 1, 0, 0],'outcome': ['t2']}
            ['matches': [1, 0, 0, 0, 1, 0],'outcome': ['t0','t0']}
        ]
        'generic': ['t1']
    }
    ###
    eval_outcome = 't1'
    eval_row =  ['a1', 'b1', 'c1', 'd2', 'e1 ', 'f2']
    query_attr = ['a1', 'b2 ', 'c1', 'd0', 'e1', 'f2']
    # matches    Y   N   Y   N   Y   Y
    #     4 matches
    eval_match_list = [1, 0, 1, 0, 1, 1]
    entry_match_score = sum(eval_match_list)
    entry_match_score == 4
    # the existing top member matching attributes form
```

```
#     a subset included in the evaluated entry.
#     Move the top member in generic part, replace it
#     with new entry.

#     top member: [1,0,0,0,1,0]
#     eval: [1,0,1,0,1,1]
work_dataset['top'][0]['outcome'].append(eval_outcome)
work_dataset == {
    'top': [
        {'matches': [1, 0, 1, 0, 1, 1], 'outcome': ['t1']}
        {'matches': [1, 0, 1, 1, 0, 0], 'outcome': ['t2']}
    ]
    'generic': ['t1', 't0', 't0']
}

eval outcome = 't0'
eval_row =   ['a1', 'b0', 'c1', 'd1', 'e1', 'f2']
query_attr = ['a1', 'b2', 'c1', 'd0', 'e1', 'f2']
# matches   Y    N    Y    N    Y    Y
#     4 matches
eval_matchlist = [1, 0, 1, 0, 1, 1]
entry_match_score = sum(eval_match_list)
entry_match_score == 4
# the matching attributes are the same. Append outcome to
#     existing top subgroup list.

#     top member: [1,0,1,0,1,1]
#     eval: [1,0,1,0,1,1]
work_dataset ['top'][0]['outcome'].append (eval_outcome)
work_dataset == {
    'top': [
        {'matches': [1, 0, 1, 0, 1, 1], 'outcome': ['t1', 't0']}
        {'matches': [1, 0, 1, 1, 0, 0], 'outcome': ['t2']}
    ]
    'generic': ['t1', 't0', 't0']
}
<----------------------------------------------------------
```

The following pseudo-code excerpt illustrate how the work_dataset structure is processed in order to generate the likelihood measures:

```
>------------------------------------------
    ###
    work_dataset == {
        'top': [
            {'matches': [1, 0, 1, 0, 1, 1], 'outcome': ['t1', 't0']}
            {'matches': [1, 0, 1, 1, 0, 0], 'outcome': ['t2']}
        ]
        'generic': ['t1', 't0', 't0']
    }
    # evaluate the entropy of each entry in the top part.
    ###
    crt_subgroup = work_dataset['top'][0]
    crt_outc_list = crt_subgroup['outcome']
    crt_outc_list == ['t1', 't0']
    crt_impurity = Entropy(crt_outc_list)
    crt_impurity == 1
    minimal_impurity = crt_impurity
    champion_list = crt_outc_list
    ###
    crt_subgroup = work_dataset['top'][1]
    crt_outc_list = crt_subgroup['outcome']
    crt_outc_list == ['t2']
    crt_impurity = Entropy(crt_outc_list)
    crt_impurity == 0
    crt_impurity < minimal_impurity
    minimal_impurity = crt_impurity
    champion_list = crt_outc_list
    # the second entry in top produces the champion
    #     list with lowest entropy
    top_score_list = champion_list
    top_score_list == ['t2']
    # the likelihood measure is represented by the outcome counts
    likelihood_data = GetCountToLikelihood(top_score_list)
    likelihood_data == [
        {'outc':'t2', 'score':1},
        # {'outc':'t0', 'score':0}
        # {'outc':'t1', 'score':0}
    ]
<----------------------------------------------------------
```

The best score (lowest impurity) is achieved by the second entry in top part of the work data set. Its outcome list provides the likelihood measures for this embodiment.

In the above examples the matching score has been simplified to a sum of zero or one values corresponding to attribute matches. In the following pseudo-code excerpts, more refined ways of computing the match score are detailed.

The match column score is made a function of the scarcity of the two attribute values involved in a comparison. For instance, if the attribute values match, and the respective attribute value has a low probability of occurrence, a larger weight should be given to the match. Also, for mismatches it is possible to assign a negative value that is proportional to the probabilities of the two attribute values involved.

The following training data is used for illustration:

```
>----------------------------------------------------------
    # attr_table:
    #     the attribute table corresponding to the training data set
    attr_table == [
        [ 'a1', 'b0', 'c0', 'd0'], # 't2'
        [ 'a1', 'b0', 'c0', 'd0'], # 't1'
        [ 'a1', 'b1', 'c1', 'd0'], # 't0'
        [ 'a0', 'b1', 'c1', 'd1'], # 't0'
        [ 'a0', 'b1', 'c2', 'd1'], # 't1'
        [ 'a0', 'b1', 'c2', 'd2'], # 't0'
    ]
    # targ_outc_list:
    #     the outcome list corresponding to the training data set
    targ_outc_list == ['t2', 't1', 't0', 't0', 't1', 't0']
<----------------------------------------------------------
```

The query entry is the following:

```
>----------------------------------------------------------
    query_attr = ['a1', 'b1', 'c1', 'd2']
<----------------------------------------------------------
```

The query entry is compared against several rows of the training table in the following pseud-code excerpt:

```
>----------------------------------------------------------
    ###
    Using the 'attr_table' data, relative frequency estimates
    of the attribute value probabilities can be calculated:
    attr_prob == [
        {'a0': 3.0/6, 'a1': 3.0/6},
        {'b0': 2.0/6, 'b1': 0.6666},
        {'c0': 0.3333, 'c1': 0.3333, 'c2': 0.3333},
        {'d0': 0.5, 'd1': 0.3333, 'd2': 0.1666},
    ]
    ###
    eval_outcome = 't2'
    eval_row =   ['a1', 'b0', 'c0', 'd0']
    query_attr = ['a1', 'b1', 'c1', 'd2']
    # matches    Y    N    N    N
    #     1 match
    # basic/default computing of entry score
    col_score_list = [1, 0, 0, 0]
    entry_match_score = sum(col_score_list)
    entry_match_score == 1
    # variant A of computing entry score
```

-continued

```
    col_score_list[0] = 1.0 - attr_prob[0]['a1']
    col_score_list[1] = 0
    col_score_list[2] = 0
    col_score_list[3] = 0
    entry_match_score == sum(col_score_list)
    entry_match_score == 1.0 - 3.0/6 == 0.5
    # variant B of computing entry score
    col_score_list[0] = 1.0 - attr_prob [0]['a1'])**2
    col_score_list[1] = -(attr_prob[1]['b1'] * attr_prob[1]['b0'])
    col_score_list[2] = -(attr_prob[2]['c1'] * attr_prob[2]['c0'])
    col_score_list[3] = -(attr_prob[3]['d2'] * attr_prob[3]['d0'])
    entry_match_score = sum(col_score_list)
    entry_match_score == (1.0 -0.5**2 -0.666*0.333
                            -0.333*0.333 -0.166*0.5) == 0.334
    # . . .
    ###
    eval_outcome = 't0'
    eval_row =    ['a0', 'b1', 'c1', 'd1']
    query_attr = ['a1', 'b1', 'cl', 'd2']
    #matches       N   Y   Y   N
    #    2 matches
    # basic/default computing of entry score
    col_score_list = [0, 1, 1, 0]
    entry_match_score = sum(col_score_list)
    entry_match_score == 2
    # variant A of computing entry score
    col_score_list[0] = 0
    col_score_list[1] = 1.0 - attr_prob[1]['b1']
    col_score_list[2] = 1.0 - attr_prob[2]['c1']
    col_score_list[3] = 0
    entry_match_score = sum(col_score_list)
    entry_match_score == (1.0 -0.666**2 + 1.0 -0.333**2) ==
1.445
    entry_match_score == 1.445
    # variant B of computing entry score
    col_score_list[0] = - (attr_prob[0]['a1'] * attr_prob[0]['a0'])
    col_score_list[1] = 1.0 - (attr_prob[1]['b1'])**2
    col_score_list[2] = 1.0 - (attr_prob[2]['c1'])**2
    col_score_list[3] = -(attr_prob[3]['d2'] * attr_prob[3]['d1'])
    entry_match_score = sum(col_score_list)
    entry_match_score == (-0.5*0.5 + 1.0 -0.666**2 +
                            1.0 -0.333**2 -0.166*0.333) ==
1.140
    entry_match_score == 1.140
    # . . .
    ###
    eval_outcome = 't0'
    eval_row =   ['a0', 'b1', 'c2', 'd2']
    query_attr = ['a1', 'b1', 'c1', 'd2']
    # matches      N   Y   N   Y
    #    2 matches
    # basic/default computing of entry score
    col_score_list = [0, 1, 0, 1]
    entry_match_score = sum(col_score_list)
    entry_match_score == 2
    # variant A of computing entry score
    col_score_list[0] = 0
    col_score_list[1] = 1.0 - attr_prob[1]['b1']
    col_score_list[2] = 0
    col_score_list[3] = 1.0 - attr_prob[3]['d2']
    entry_match_score = sum (col_score_list)
    entry_match_score == (1.0 -0.666 + 1.0 -0.166) == 1.168
    entry_match_score == 1.168
    # variant B of computing entry score
    col_score_list[0] = -(attr_prob[0]['a1'] * attr_prob[0][a0'])
    col_score_list[1] = 1.0 - (attr_prob[1]['b1'])**2
    col_score_list[2] = -(attr_prob[2]['c1'] * attr_prob[2][c2'])
    col_score_list[3] = 1.0 - (attr_prob[3]['d2'])**2
    entry_match_score = sum(col_score_list)
    entry_match_score == (-0.5*0.5 + 1.0 -0.666**2
                            -0.333*0.333 + 1.0 -0.166**2) == 1.168
    entry_match_score == 1.168
    # Variant B assigns to mismatches a negative value that is
    #    proportional to the probabilities of the two values
         occurring
    <----------------------------------------
```

Additional Improvements:

An improvement, applicable when the training table contains too many entries, consists in using just a subset of the rows for evaluation against the query entry. The choice of the rows to process could be random, or done according to some other criteria.

Another improvement is weighting the outcome counts in order to compensate for their uneven proportions in the training data set.

Although the focus of the description has been on discrete outcome and attribute values, the disclosed methods can be modified such that they can be applied to continuous counterparts.

The described methods and embodiments should not be interpreted as limiting the scope of the disclosure to the particular details presented. It is always possible to rearrange the structures, the sequence of processing, or the formula expressions, to achieve the same or similar results. The present disclosure intends to cover all equivalent embodiments.

The above disclosure describes the embodiments in terms of algorithmic processes or operations. These algorithmic descriptions and representations convey the substance of the improvements. These operations, while described functionally, computationally, or logically, are understood to be implemented by computer programs comprising instructions for execution by a processor or equivalent electrical circuits, microcode, or the like. The described procedures may be embodied in software, firmware, hardware, or any combinations thereof.

The invention claimed is:

1. A machine learning method for predicting unknown attributes based on available data, the method comprising:
   accessing a training table of attribute values, wherein each row corresponds to a training entry, while columns correspond to attributes;
   accessing a training target list, where each element is a target outcome that is associated to the corresponding row from said training table;
   accessing a query data entry consisting in a list of attribute values corresponding to the columns of said training table; and
   calculating, by a machine learning device, a likelihood measure of said target outcomes, said calculation comprising:
     evaluating rows of the training table and processing each evaluated item, where the processing comprises:
       evaluating each of said attributes, and for each pair of values, one from the query data entry and one from the current row, computing a match column score;
       computing an entry match score for the ensemble of said match column scores;
       defining a row summary ensemble that contains the target outcome, said entry match score, and the list of matching attributes;
       aggregating content from said row summary ensemble to an entry of a work data set; and
     extracting likelihood measures for target outcomes by processing said work data set.

2. The method of claim 1, where said match column score is a function of match degree, features of the attribute, and features of the attribute values in said pair.

3. The method of claim 1, wherein said aggregating content from the row summary ensemble comprises appending said target outcome to the corresponding match score list, wherein each match score list contains only outcomes from rows that have the same entry match score; and wherein the work data set is constituted by the ensemble of match score lists.

4. The method of claim 3, wherein said processing of said work data set comprises:
selecting the match score list with the best score;
using the selected data to calculate said likelihood measures; and
using a tiebreak procedure in case more than one target outcome has the same number of occurrences, wherein said tiebreak procedure comprises:
selecting the next best match score list to provide additional counts to break the tie, and in case the tie persists, repeating the procedure with the next best match score list.

5. The method of claim 3, wherein said processing of work data set comprises:
ordering said match score lists according to said entry match score, such that the match score list with the best score is placed on top;
creating a set of cascaded match lists by aggregating the match score lists starting from the top, such that the content of the top match score list is added to the next match score list below, and the resulting new content is further added to the next match score list, etc., until the whole set is processed;
computing a predictive score for each of the cascaded match lists, and selecting the one with the best predictive power, and
using the selected list to calculate said likelihood measures.

6. The method of claim 5, wherein the computation of the predictive score comprises calculating an impurity measure of the target outcome list, and the best predictive power corresponds to the lowest impurity.

7. The method of claim 1, wherein said work data set includes a top collection of subgroup lists, wherein each subgroup list contains outcome values corresponding to row entries that match the same attributes in the query data entry, and the row entries have the top match score.

8. The method of claim 1, wherein said work data set includes a top collection of subgroup lists, wherein each subgroup list contains outcome values corresponding to row entries that match the same attributes in the query data entry, and no set of matching attributes of a subgroup list is included in the set of matching attributes of another subgroup list.

9. The method of claim 8, wherein said processing of said work data set comprises computing an impurity measure of the subgroup lists in the top collection and choosing as predictor list the subgroup list with lowest impurity, and where said predictor list is used to calculate said likelihood measures.

10. The method of claim 1, wherein said aggregating content from the row summary ensemble comprises updating the score of the corresponding target outcome with said entry match score; and wherein the work data set is constituted by the ensemble of target outcome scores.

11. The method of claim 10, wherein said updating of the target outcome score consists in using a transformation function on the entry match score, and the result of the transformation function is added to the target outcome score.

12. The method of claim 11, wherein said transformation function is an exponential function.

13. A machine learning system comprising:
a processor configured to execute instructions; and
a non-transitory computer-readable medium containing instructions for execution on the processor, the instructions causing the processor to perform steps of:
accessing a training table of attribute values, wherein each row corresponds to a training entry, while columns correspond to attributes;
accessing a training target list, where each element is a target outcome that is associated to the corresponding row from said training table;
accessing a query data entry consisting in a list of attribute values corresponding to the columns of said training table; and
calculating by a machine learning device a likelihood measure of said target outcomes, said calculation comprising:
evaluating rows of the training table and processing each evaluated item, where the processing comprises:
evaluating each of said attributes, and for each pair of values, one from the query data entry and one from the current row, computing a match column score;
computing an entry match score for the ensemble of said match column scores;
defining a row summary ensemble that contains the target outcome, said entry match score, and the list of matching attributes;
aggregating content from said row summary ensemble to an entry of a work data set; and
extracting likelihood measures for target outcomes by processing said work data set.

14. A non-transitory computer readable storage medium comprising instructions executed by a processor, the instructions comprising:
accessing a training table of attribute values, wherein each row corresponds to a training entry, while columns correspond to attributes;
accessing a training target list, where each element is a target outcome that is associated to the corresponding row from said training table;
accessing a query data entry consisting in a list of attribute values corresponding to the columns of said training table; and
calculating a likelihood measure of said target outcomes, said calculation comprising: evaluating rows of the training table and processing each evaluated item, where the processing comprises:
evaluating each of said attributes, and for each pair of values, one from the query data entry and one from the current row, computing a match column score;
computing an entry match score for the ensemble of said match column scores;
defining a row summary ensemble that contains the target outcome, said entry match score, the list of matching attributes;
aggregating content from said row summary ensemble to an entry of a work data set; and
extracting likelihood measures for target outcomes by processing said work data set.

* * * * *